United States Patent [19]

Bryll

[11] 3,917,189

[45] Nov. 4, 1975

[54] INERTIA LOCKING RETRACTOR

[75] Inventor: Medard Z. Bryll, Palos Park, Ill.

[73] Assignee: Gateway Industries, Inc., Chicago, Ill.

[22] Filed: Dec. 17, 1973

[21] Appl. No.: 425,087

Related U.S. Application Data

[63] Continuation of Ser. No. 257,372, May 26, 1972, abandoned.

[52] U.S. Cl.......................... 242/107.4; 242/107.4 X
[51] Int. Cl............................................. A62b 35/00
[58] Field of Search...................... 242/107.4, 107.7; 280/150 SB; 297/388

[56] References Cited
UNITED STATES PATENTS

| | | | |
|---|---|---|---|
| 3,294,446 | 12/1966 | Fontaine | 242/107.4 X |
| 3,430,891 | 3/1969 | Burleigh | 242/107.4 |
| 3,578,260 | 5/1971 | Kell | 242/107.4 |
| 3,695,545 | 10/1972 | Peters | 242/107.4 |
| 3,740,000 | 6/1973 | Takada | 242/107.4 |

Primary Examiner—Edward J. McCarthy
Attorney, Agent, or Firm—Firch, Even, Tabin & Luedeka

[57] ABSTRACT

An inertia locking retractor for a safety seat belt on a reel includes means biasing the reel to retract the belt and is provided with an inertia means operable as a result of a high belt acceleration in the belt extending direction, as may occur at the time of an accident, to cause a pawl means to move into operable blocking relationship with a ratchet means to prevent further turning of the reel in the belt extending direction. Preferably, the retractor is also operable to place the belt in a tensionless state about the seated occupant by manipulating the belt and thereby the inertia means to cause the belt to be held and thereby relieved of the tension of the reel biasing means. Also, in the preferred retractor, the belt may be extended to accommodate slow movement of the occupant but locks readily with high acceleration of the belt as at the time of an accident. The pawl means and the ratchet means are timed and structurally related to the inertia means so that the pawls cannot strike the tops of the ratchet teeth and shear them. When the belt is initially being extended at a high acceleration from a fully wound condition on the belt reel, a hold-out means prevents operation of the inertia operated locking means.

31 Claims, 19 Drawing Figures

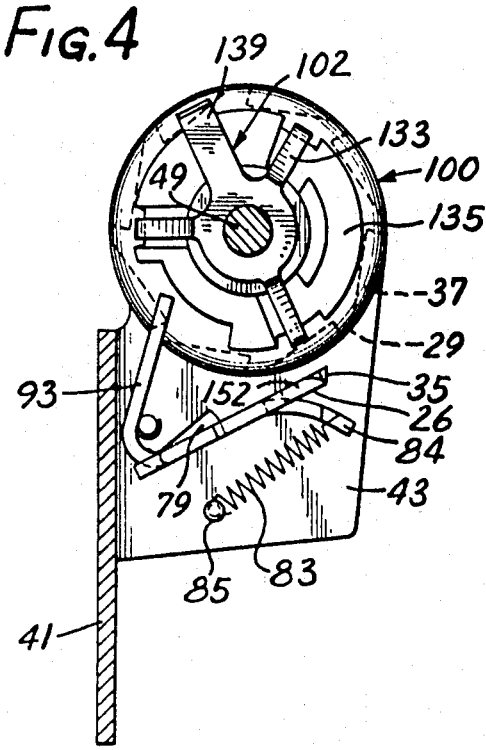
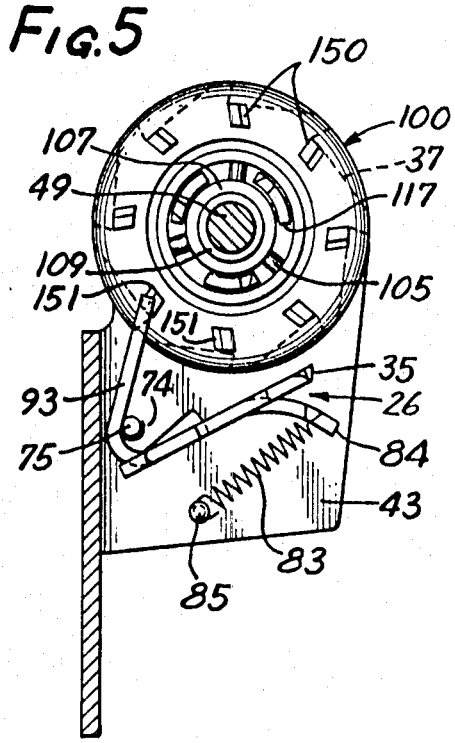
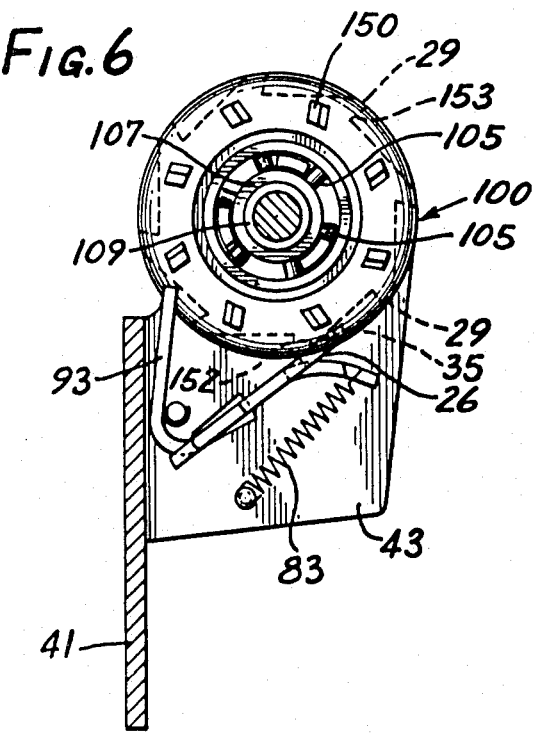
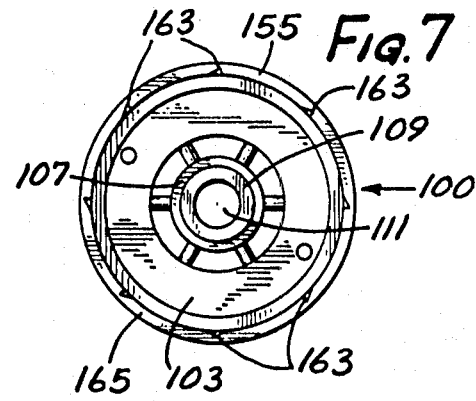
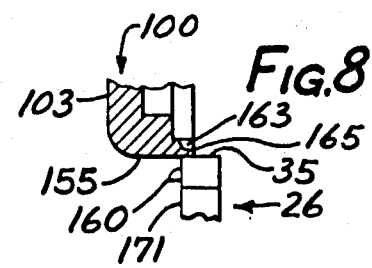
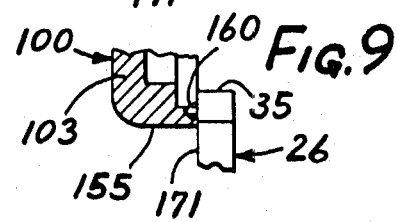

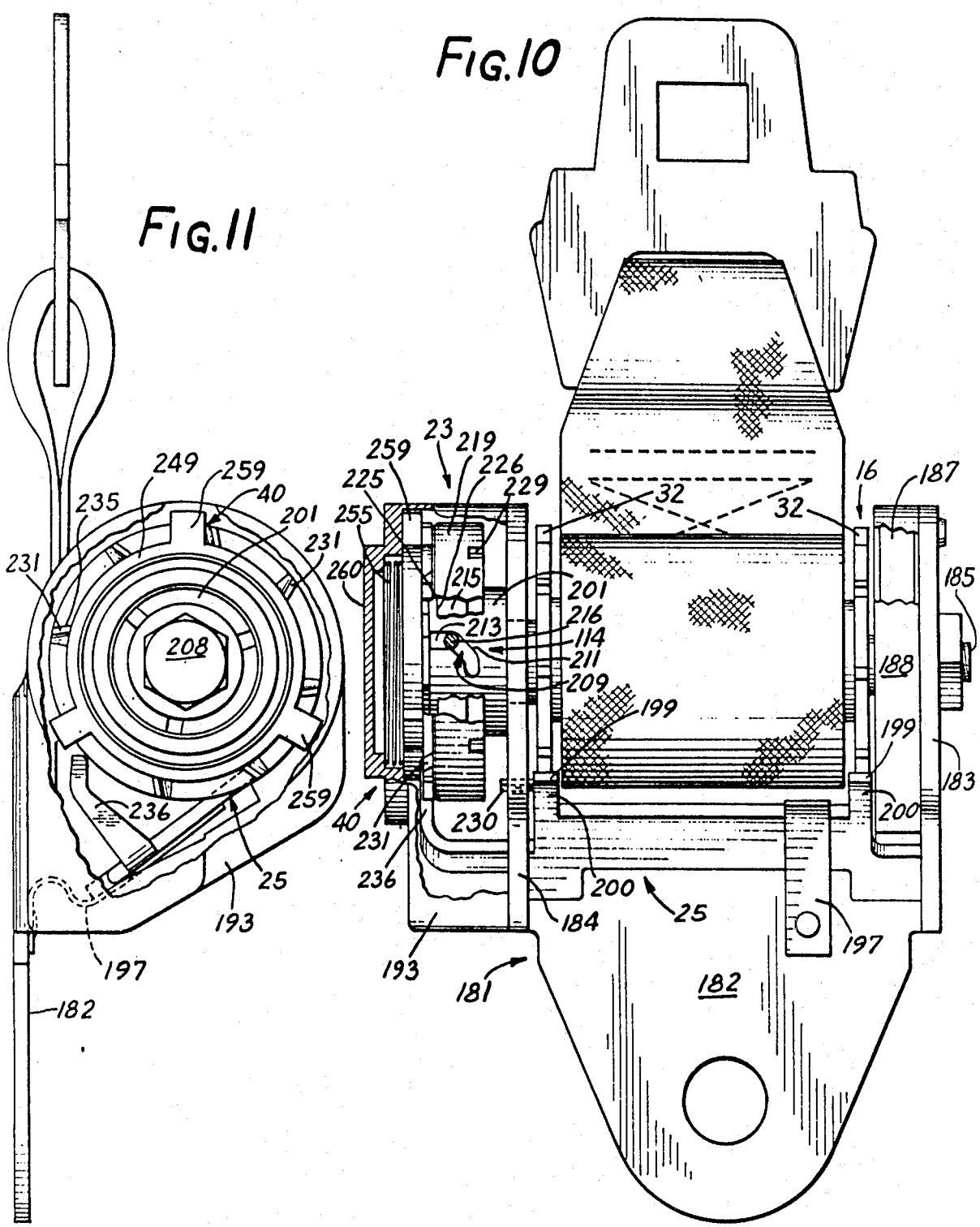

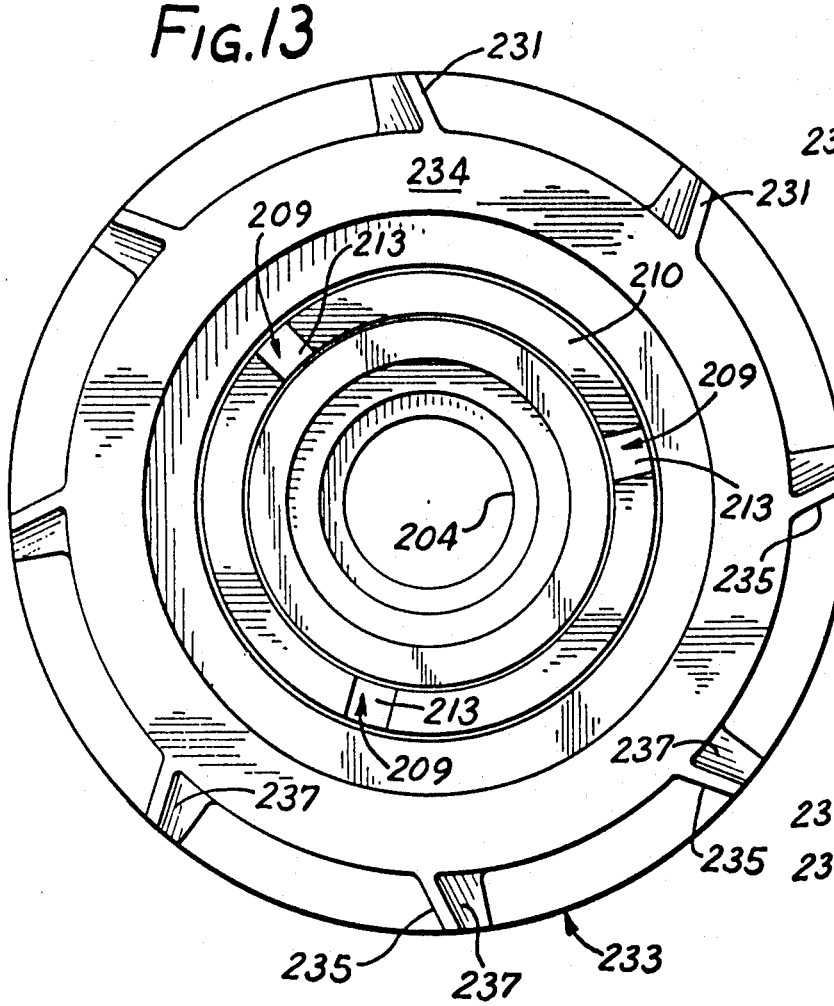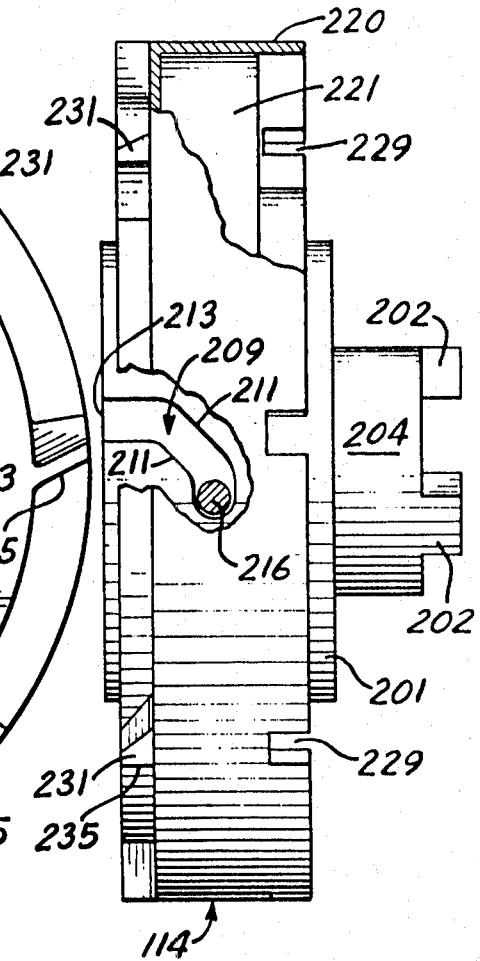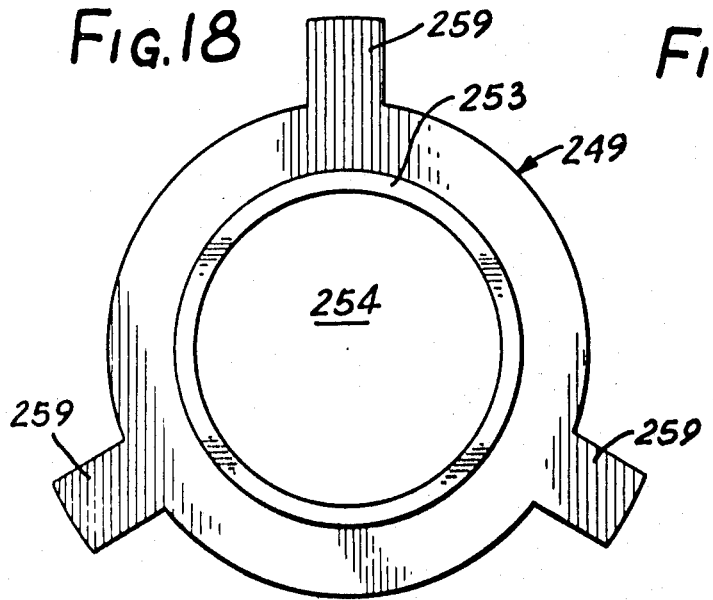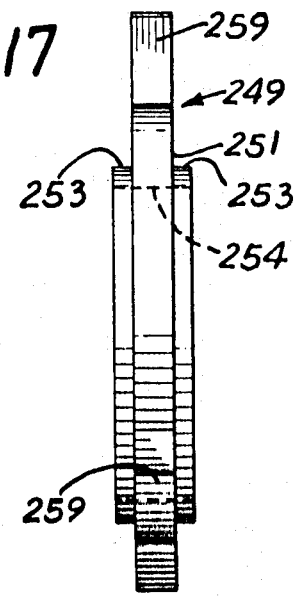

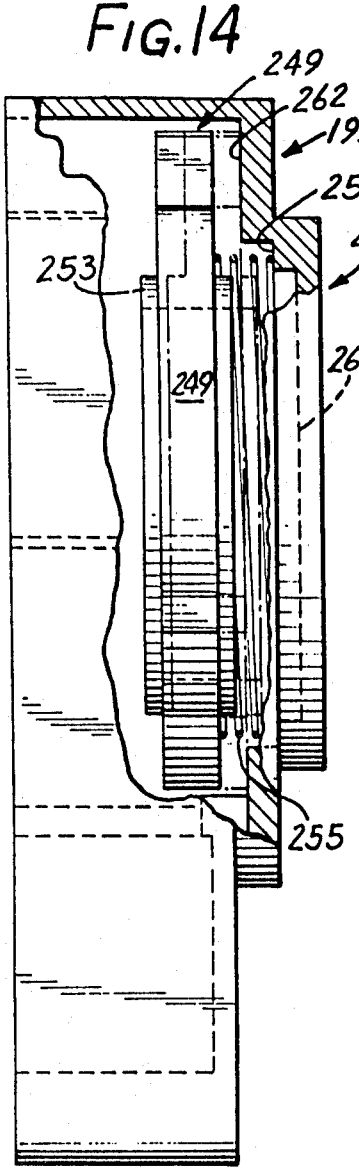
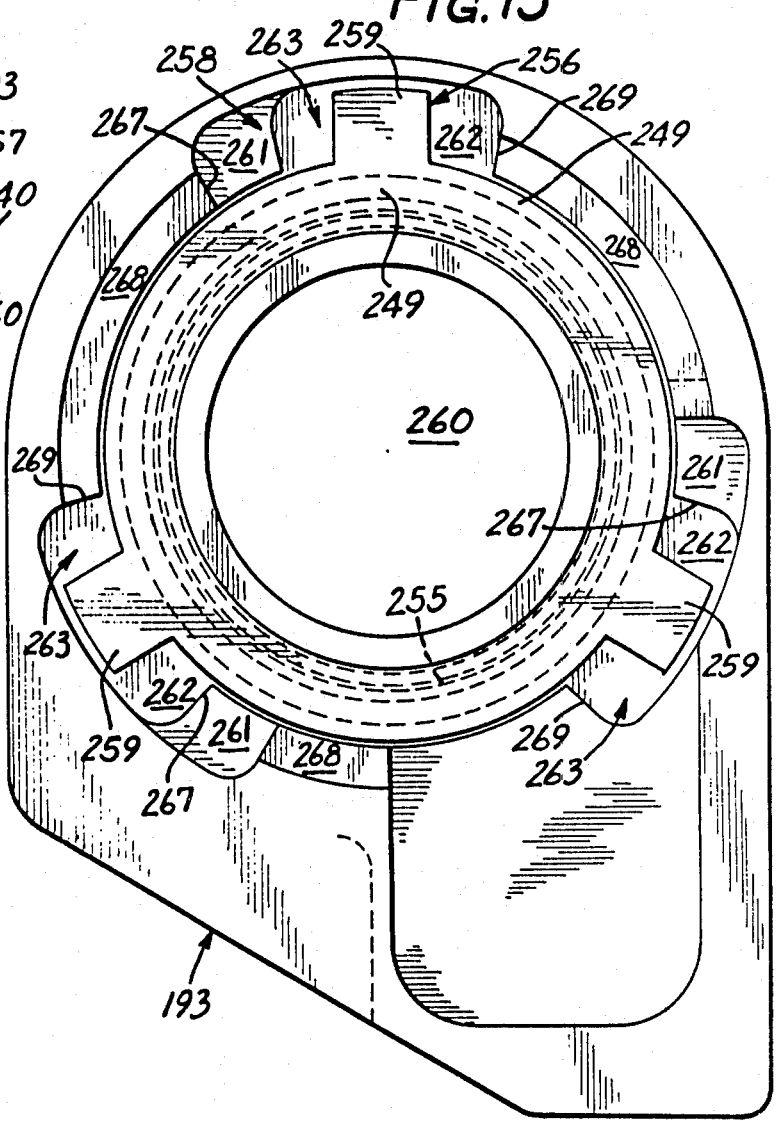
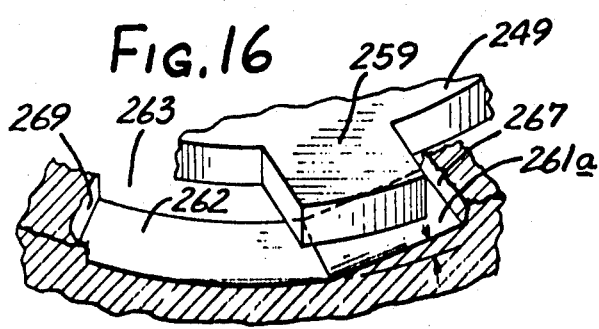

INERTIA LOCKING RETRACTOR

This is a continuation of application Ser. No. 257,372, filed May 26, 1972, now abandoned.

This invention relates to a seat belt retractor and more particularly to an inertia retractor in which the seat belt will automatically be locked against extension when the vehicle is impacted to cause the occupant to move relative to the vehicle with an acceleration above a predetermined acceleration.

More specifically, when an accident occurs, the occupant's inertia may cause him to move relative to the vehicle at a rate beyond which is deemed safe, and his seat belt retractor automatically locks against further extension of the seat belt as would allow him to move to the maximum extent of the seat belt. Locking retractors of the inertia kind have been proposed in the past but have not been used as standard equipment in automobiles and have had various shortcomings. For example, some inertia retractors will only operate in a given plane, usually because they have a gravity operated device therein, and are not reliable when the vehicle is on an incline or the retractor is mounted at an unusual angle to the horizontal in the vehicle. Still other retractors have been found to be not sufficiently sensitive for use in automobiles as they will not lock unless a relatively high acceleration is applied and the seat belt is extended considerably. Preferably, for automobiles the inertia retractor should be sensitive to a one-half G acceleration with a belt extension of one inch after the belt has been extended three-fourths of its total length about the occupant.

On the other hand, other inertia retractors will lock while the occupant is pulling the belt from the retractor reel to secure it about himself when pulling rapidly with over a one-half G acceleration. Such locking may be annoying and a source of consternation as to a proper method of withdrawal of the belt for strapping about oneself.

Other retractors are too complex in operation and are constructed of many and expensive parts making them too costly to be commercially feasible. Finally, with increasingly strict government regulations to be met, the inertia retractor must be very reliable and operate without fail for large numbers of operations even when subjected to very adverse conditions of snow, water, dust, heat or cold.

Often inertia retractors of the prior art were equipped with a manual operator which had to be manipulated to release the locked condition to allow the seat belt to rewind on the retractor reel. Such manual operators restrict the retractors from being placed to the side and rearwardly of the seated occupant or from being totally inaccessible to the seated occupant. The occupant must be able to get himself out after a crash. While release cables or lever systems could be designed to allow placement of the retractor at various locations, these add to the cost, require space, and may malfunction. Therefore, it is preferred that the retractor be operated with simple manipulations of the seat belt itself between its various locked and released conditions, particularly to release the belt for retraction onto the retractor reel.

The retractor of the present invention, in one embodiment thereof, may be rendered tensionless in the sense that the force of the retracting reel spring pulling the seat belt taut about the occupant will not be felt by the occupant when the seat belt is worn. Also, the retractor of the present invention may be constructed to allow the passenger freedom of movements, when such movements slowly extend the seat belt from the retractor, e.g. when leaning toward a cigarette lighter. Preferably, the inertia seat belt retractor will operate to satisfy these varying and seemingly conflicting requirements and will not lock should the occupant give a sharp pull on the belt when extending the belt about himself while locking upon a sharp pull due to inertia of the wearer's body at the time of an accident. Thus, a seat belt retractor of this kind is carefully programmed and timed to operate in various manners dependent upon the position of the belt and the rate and direction of belt travel.

Accordingly, a general object of the present invention is to provide a new and improved inertia seat belt retractor of the foregoing kind.

Other objects and advantages of the invention will become apparent from the following detailed description taken in connection with the accompanying drawings in which:

FIG. 4 is a partial sectional view taken substantially along the line 4—4 of FIG. 1;

FIG. 5 is a view taken substantially along the line 5—5 of FIG. 1;

FIG. 6 is a view similar to FIG. 5 but with the pawl engaged;

FIG. 7 is an elevational view of an inertia wheel used in the retractor of FIG. 1;

FIG. 8 is a view which illustrates a pawl and inertia wheel in a non-locking position;

FIG. 9 is a view which illustrates the pawl and inertia wheel in an operative position holding a seat belt tensionless;

FIGS. 10 and 11 are views which illustrate another embodiment of the invention with means to prevent reel locking when the belt is fully retracted;

FIGS. 12, 13 and 19 are views which illustrate an inertia means used in the retractor shown in FIG. 10;

FIGS. 14 and 15 are views which illustrate a hold-out means used in the retractor of FIG. 10;

FIG. 16 is a view which illustrates another embodiment of the hold-out means; and FIGS. 17 and 18 are views which illustrate a braking disc.

Figure 1:
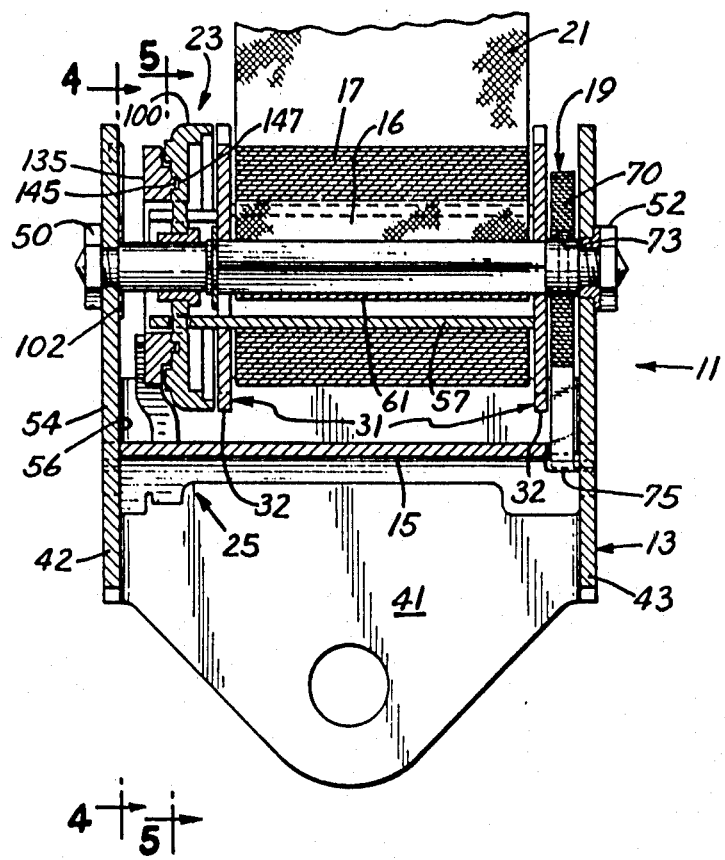
FIG. 1 is a longitudinal sectional view taken through a retractor embodying the features of the invention.
Figure 2:
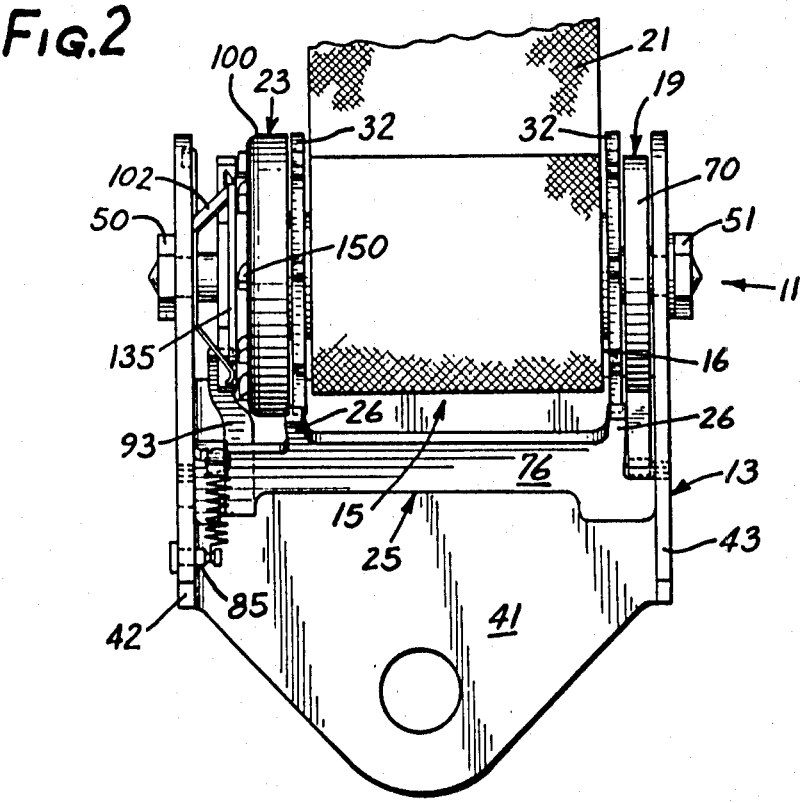
FIG. 2 is an elevational view of the retractor shown in FIG. 1.

Herein, the invention is embodied in a seat belt retractor 11 having a support means 13 in the form of a U-shaped casing or frame in which is rotatably mounted a reel means 15 including a reel 16 on which is wound a seat belt 17. The seat belt 17 is wound on the reel 16 under the urging of a biasing means 19 in the form of a spring to retract an extended portion 21 of the seat belt extending outwardly from the reel 16. After the belt is extended about the occupant, the reel 16 will be automatically locked to stop further turning of the reel 16 and further extension of the seat belt 17 when the seat belt is accelerated outwardly from the reel means above a predetermined acceleration, for example, one-half G inertia means 23 which operates a pawl means 25, comprising at least one pawl 26, to shift from a release position to an operative position in blocking or locking engagement with a tooth or shoulder 29 on a ratchet means 31 which includes at least one ratchet wheel 32. Preferably two ratchet wheels 32 and a pair of cooperating pawls 26 are provided.

In the first described embodiment of the invention, the occupant may be relieved of the tension and the pull of the belt about his body, i.e., the belt will be tensionless and merely resting on his body, by following a programmed sequence of events, namely allowing a slight retraction of the belt, which occurs naturally when the occupant fastens the belt or brings it into fastening position, and then exerting a sharp snap or acceleration of the belt. This sequence, as will be explained in greater detail, causes the inertia means 23 to operate the pawls 26 to a position holding the reel 16 against retracting. This relieves the tension in the extended belt portion as would retract the belt tautly against the occupant, making him uncomfortable. Although the seat belt 17 is then tensionless, it remains operative to restrain the occupant. As will be explained in greater detail the occupant may move slowly to cause the belt to be extended even when the belt has been placed in this tensionless state.

On the other hand, should the belted occupant experience a sudden acceleration relative to the vehicle as under a sudden impact during an accident, the occupant's body will exert a sharp jerk on the belt in the unwind direction but any substantial belt unwinding is prevented by pawls 26 abutting teeth 29 on the ratchet wheels 32 and holding the reel 16 against turning. When the seat belt is tensionless and the occupant desires to remove the seat belt 17 and to cause it to retract automatically, the occupant releases the belt fastening means, a buckle, and exerts a slight pull on the seat belt 17 causing the inertia means 23 to release the pawls 26 to shift to the non-blocking position. Then, upon release of the belt by the occupant, the spring means 19 turns the reel 16 and rewinds the extended seat belt portion 21 into the retractor 11. Thus, it will be seen that the belt may be readily extended, held tensionless about the body, extended with slow movements, locked with fast movements, and readily released for rewinding.

If the seat belt is not placed in the tensionless state but rather is tensioned about the occupant, a sudden extension of the belt 17 beyond a predetermined rate also causes the inertia means 23 to shift the pawls 26 to abut teeth 29 on the ratchet wheels 32 and lock the reel against further extension. If the belt is in its tensioned state about the occupant who then releases the belt for retraction, the reel biasing means 19 is operative to rewind the belt to its fully retracted condition without an additional operation of the inertia means 23 as is necessary when the belt is in the tensionless state.

In accordance with another important aspect of the invention, the pawls 26 are structurally related to the inertia means 23 and to the ratchet teeth 29 and timed to operate with one another to assure that teeth engaging noses 35 of the pawls 26 will be closed, that is, positioned inwardly of and between adjacent teeth on each ratchet wheel 32 to abut against ratchet teeth turning into the pawl noses 35 thereby blocking further reel turning and belt extension. The rotational and spatial relationships, as will be explained in detail, are such that the pawl noses 35 cannot strike the tops of the ratchet teeth but must move radially inward of the tops of teeth to guiding surfaces 37 extending between and separating adjacent teeth. With the pawl noses radially inward and adjacent or touching the guiding surfaces 37 continued rotation of the teeth 29 in the belt-extending direction abuts base portions 39 of the teeth against the pawl noses 35. Thus, the pawls are timed and are closed to prevent their hitting the radially outer ends of the teeth and shearing them, as might occur, when a larrge force and a fast extending acceleration of the seat belt occurs during an accident by throwing the occupant's body with a large force against the seat belt 17.

In accordance with another embodiment of the invention, the inertia means 23 may be prevented from operating and blocking a turning of the reel 16 during an initial fast unwinding of the belt. That is, if the occupant should suddenly accelerate a fully retracted belt with an acceleration beyond the predetermined rate when extending the belt to a buckling position, a means 40, as will be explained in connection with FIGS. 10 and 11, prevents operation of the inertia means 23 to lock the belt reel as the seated occupant may resent such a stopping of the belt extension. Thus, the occupant may reach for the belt and initially extend the belt with a rapid motion which would, without the means 40, cause the inertia means 23 to lock the belt during its initial extension to a position about the ojcupant. As will be explained in greater detail, the illustrated hold-out means 40 is not effective to prevent locking of the reels when the extended belt receives a slight retraction as will occur during a buckling or securing of the belt about the occupant. Therefore, in the event of a subsequent sudden acceleration of the occupant's body beyond the predetermined rate, the inertia means 23 would cause a locking of the retractor against belt extension to its maximum length. Also, as will be explained in detail, the preferred hold-out means 40 will be overcome with a very high acceleration as may occur with an accident, e.g., two G's or more.

Referring now in greater detail to the various elements of the retractor 11, the support means 13 comprises a generally U-shaped casing having a bottom wall or base 41 and upstanding parallel side walls 42 and 43 integral therewith along lower edges 45 of the side walls. The side walls 42 and 43 have respective outer surfaces 54 and inner surfaces 56. The reel means 15 includes a spindle 49 which spans these side walls and is journaled in apertures 47 therein. The spindle 49 is held against axial movement as by a threaded nut 50 thereon (as best seen in FIG. 1) abutted against the outwardly facing surface 54 of the side wall 42 and a nut 51 threaded on the opposite end of the spindle and disposed adjacent the outer surface 54 of the side wall 43. In this manner, the spindle is journaled for rotation between the side walls 42 and 43 about an axis generally horizontal, as viewed herein, and parallel to the base 41. As will be explained, the retractor 11 may be disposed in various planes and will still operate successfully.

The reel 16 for winding the seat belt 17 is carried by the spindle 49 and is fixed thereto to rotate with the spindle. The reel 16 comprises a generally C-shaped cross section cylindrical reel hub 57 having a longitudinally extending slotted opening 59 to receive looped end 61 of the belt for fastening to the spindle 49. The interior of the generally circular hub is spaced from the spindle 49 to accommodate the thickness of web of the seat belt 17. In this instance, a pair of ratchet wheels 32 are fixed to opposite ends of the reel hub 57 and provide parallel guide flanges for guiding the longitudinally extending edges 63 of the seat belt to wind neatly on the hub when the belt is retracted. To assure that the hub 57 and the ratchet wheels 32 move with the spindle 49, the spindle 49 may be keyed to the ratchet wheels by having a hexagonal cross section for insertion into a hexagonally shaped opening 65 (FIG. 3) in each of the ratchet wheels 32.

Figure 3:
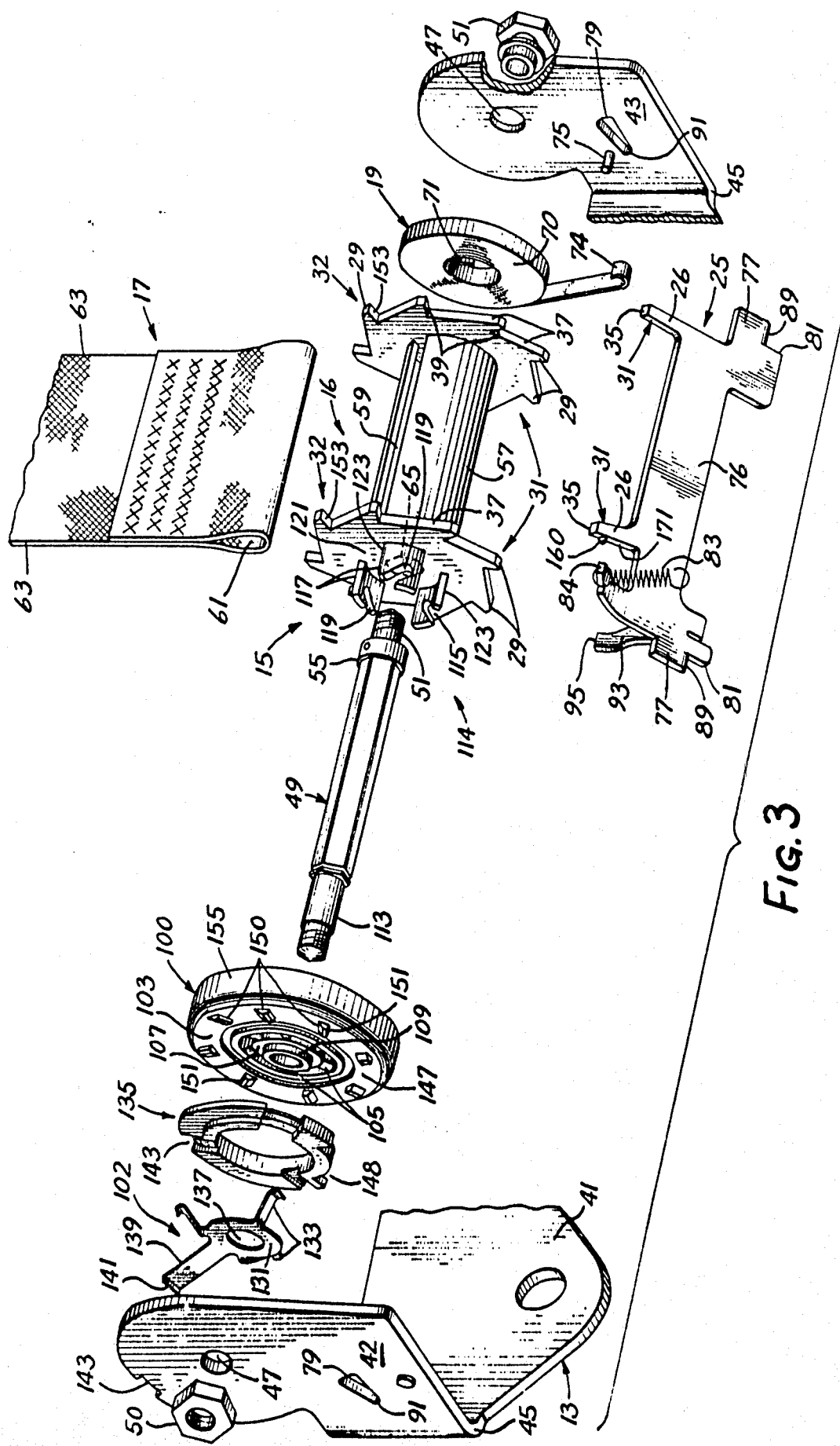
FIG. 3 is an exploded perspective view of the retractor illustrated in FIG. 1.

The reel 16 is biased to wind the seat belt in the counterclockwise direction, as seen in FIG. 3 by the biasing means 19 which is in the form of a spiral spring 70 which has an inner small end 71 fastened to an end of the spindle as by a fastener 73, as seen in FIG. 1. The opposite large end of the spiral spring is connected by a hook end 74 to a pin 75 projecting inwardly from the inner surface 56 of the side wall 43 to which the pin is fastened. Thus, the spring urges the spindle 49 to turn counterclockwise as viewed in FIG. 3 to wrap the belt 17 on the reel hub with the spindle turning within the apertures 47 in the side walls 42 and 43.

The ratchet wheels 32 may be in various configurations as may the teeth 29 which are sometimes referred to as shoulders. Preferably, the teeth 29 are spaced equally and circumferentially about the rotational axis of the reel 16 and are separated by elongated slide surfaces 37 which undersides 152 of the pawl noses 35 may abut and slide along until abutting an upstanding radially outwardly extending tooth 29. In this instance, the slide sufaces 37 are generally flat and planar, although they may be arcuate, and separate eight ratchet teeth.

To distribute the forces equally between the ratchet wheels 32, the pawl means 25 is provided with a pair of pawls 26 each of which extends outwardly and upwardly, in this instance, from a common connecting flat bar 76 of the pawl means. At opposite ends of the connecting bar 76, a pair of pivot lugs 77 project outwardly and into triangular shaped apertures 79 in the respective side walls 42 and 43. More specifically, the lugs 77 project outwardly from vertically extending end walls 81 of the connecting bar with the end walls 81 positioned adjacent the inner surfaces 56 of the respective side walls 42 and 43 to hold the pawls 26 against longitudinal movement and thereby from misalignment with the ratchet wheels 32.

As best seen in FIGS. 4, 5 and 6, it is preferred that the pawls 26 be biased to a non-blocking or non-locking position by a biasing spring 83 having an upper end secured to a hook 84 extending upwardly and rearwardly from the connecting bar 76. An opposite lower end of the spring 83 is secured to a pin 85 fastened to the side wall 42. The spring 83 is a contractile spring and biases a lower rounded end 89 on each pivot lug 77 to abut a lower rounded corner 91 at the bottom of the respective aperture 79. The rotational movement of the pawls 26 is limited to the angular relationship between the inclined side walls of the triangular apertures 79. Integral with the cross bar 76 of the pawl means is a pawl actuating finger 93 which is connected at one end thereof to the cross bar 76. The actuating finger 93 has a free end 95 which projects toward an inertia wheel 100 to be actuated thereby, as will be described.

In accordance with the present invention, the inertia means 23 comprises an inertia member in the form of inertia wheel 100 which is mounted for both longitudinal and rotational movement with respect to the reel 16 and the spindle 49. The illustrated inertia wheel is a generally bell-shaped member and is made of a dense material to provide the desired mass which when accelerated at the predetermined rate overcomes frictional resistances and a spring force from an inertia wheel spring 102, as will be explained in greater detail, to pivot the pawl means against the force of the spring 83. The inertia wheel generally has an outer projecting flange 155 which is annular and projects toward an adjacent one of the ratchet wheels 32. A generally annular wall 103 extends radially between the laterally projecting flange 155 and has an inner portion connected by a series of spokes 105, as best seen in FIG. 7, to an inner circular hub 107 in which is mounted a bearing 109. In this instance, the bearing 109 is a plastic sleeve forced into the hub 107. The bearing 109 has a central aperture 111 which encircles a smooth cylindrical surface 113 of the spindle 49, as best seen in FIG. 3, for freely turning relative thereto in either a clockwise or counterclockwise direction.

For the purpose of rotating the inertia wheel 100 and sliding it longitudinally relative to the reel means 15, the inertia wheel 100 is coupled to the reel means 15 by a cam means 114 which includes cam grooves 115 formed in each of three extensions 117 of the spool hub 57. Each of the three extensions is generally curved arcuately about the axis of rotation of the spindle 49 and is spaced from the spindle 49. The extensions 117 project through three spaced openings in the ratchet wheel 32 adjacent the inertia wheel 100. In a similar manner, three extensions of the reel hub 57 project into the other ratchet wheel 32 to prevent relative movement between the ratchet wheels 32 and the reel hub 57.

To cause both a rotational and longitudinal movement of the inertia wheel 100, the cam grooves 115 are formed with curved walls 119 which are inclined to the longitudinal axis and also extend in an arcuate direction for a limited number of degrees. For example, the cam grooves may be inclined between 30° and 45° to the axis of rotation. The cam grooves have open outer ends to receive therein the spokes 105 of the inertia wheel 100. When three of the six spokes 105 are inserted into the three cam grooves 115, the remaining three spokes 105 are each positioned in a respective space 121 between adjacent axial extending walls 123 of adjacent extensions 117. As will be explained, these other spokes 105 in the spaces 121 will abut the walls 123 to limit the rotational movement of the inertia wheel relative to the extensions and as a result terminate the thrust from the cam surfaces forcing the inertia wheel outwardly from the adjacent ratchet wheel.

The cam wheel 100 is urged to a position closely adjacent the ratchet wheel 32 to position its spokes 105 in abutting engagement with bottom end walls 127 of the cam grooves 115 by the spring means 102 which, in this instance, is in the form of a leaf spring body 131 having flexed spring legs 133. There are three spring legs 133, in this instance, which project toward the inertia wheel 100 and act through a braking means in the form of a brake disk 135 which engages the annular wall 103 of the inertia member 100. The legs 133 are flexed so that the inertia member is urged in this instance to the right as viewed in FIG. 3 to a position adjacent the ratchet wheel 32. This acts to stabilize the inertia wheel in a position perpendicular to the axis of the spindle 49. The spring member 131 is provided with a central aperture 137 for surrounding the cylindrical surface 113 of the spindle 49.

To prevent rotation of the spring body 131 with turning of the inertia wheel 100, the spring body is formed with an anchor leg 139 with an offset end 141 seated within a notch 143 in the stationary casing side wall 42.

The braking disk 135 functions to dampen the oscillatory movement of the inertia wheel 100 and to prevent any bounce thereof as might cause a misoperation of the retractor. The brake disk 135 also serves to apply a retarding force to the inertia wheel to assist in its being retrograded relative to the reel extension and in this manner acts with wheel's inertia. Hence, the retarding force of the braking disk on the inertia wheel may be thought of as a "false" inertia or "psuedoinertia". The illustrated braking disk may be made of a plastic material in frictional contact with the annular wall 103 of the inertia member 100. The illustrated braking disk 135 is formed with three radially extending slots 143, each receiving therein a respective spring leg 133 which acts to prevent rotation of the braking disk. An annular laterally projecting flange 145 is formed on one side of the brake disk to fit into a circular groove 147 on the inertia wheel 100 to assure that the braking disk stays properly centered. An arcuate cut-out 148 is made on the bottom side of the brake disk 135 to accommodate the pawl actuating finger 93 of the pawl means.

For the purpose of actuating the pawl means 25 to bring the pawl noses 35 into operational relationship with the ratchet wheels 32, the inertia wheel 100 is provided with pawl actuating means which may take various forms such as, for example, sloped projections or teeth 150. The illustrated teeth 150 are in the form of short metal projections or protuberances which are equally spaced from one another angularly about the annular wall 103 and equidistantly from the rotational axis of the inertia wheel 100. At rest, the spring 102 urges the inertia wheel 100 to the right with the spokes 105 abutting the bottom walls 127 of the cam grooves 115 at which position the teeth 150 lie in a plane spaced from the pawl actuating finger 93. For example, the teeth 150 may be spaced about 0.030 inch longitudinally of the spindle 49, to the right as viewed in the drawings, from the pawl actuating finger 93. In this instance, there are eight teeth 150 having centers spaced at 45° with a leading surface 151 disposed to engage the pawl finger 93 and pivot the pawl noses 35 toward the slide surfaces 37 of the ratchet wheels 32. The teeth are of a very limited arcuate extent and are spaced apart and are angularly related to the spokes 105 on the same inertia wheel and thereby positioned in a predetermined angular relationship relative to the ratchet teeth 29 as will be explained.

In the preferred embodiment of the invention, the occupant may, after the seat belt is extended, make the belt tensionless by exerting a sharp pull on the belt to extend it under acceleration sufficiently to cause the inertia means 23 to operate and render the pawls 26 operative to hold the reel against the urging of the spring force from the biasing means 19 whereby the belt will be relieved of tension and may lie limp on the occupant. More specifically, the sharp pull causes the inertia wheel 100 to lag in rotation relative to the reel and to be cammed by cam surfaces 119 longitudinally to abut a projection 150 against the pawl finger 93 and to pivot the pawl noses 35 to adjacent or touching the guide surfaces 37 between ratchet teeth 29. Before the inertia wheel 100 returns from its outward position, the adjacent ratchet teeth 29 turn to abut the pawl noses which are now in the closed position, thereby stopping further belt extension. Preferably, the pawl noses 35 abut the reversely inclined teeth walls 153 which capture and hold the pawl noses 35 and even drive the pawl noses inwardly toward the bases of the ratchet teeth.

During this time, the inertia wheel 100 returns toward its position adjacent the closest one of the ratchet wheels 32, and the annular flange 155 on the inertia wheel is superposed over a tang 160, as best seen in FIG. 9, on the pawl 26 disposed adjacent the inertia wheel 100. With the flange 155 overlying the tang 160, relaxation of the seat belt 17 allows pawl noses 35 to separate from the inclined teeth walls 153, and the pawls 26 begin to pivot under the urging of the spring 83 to shift the tang 160 outwardly to abut the slide along the flange wall 155 as the reel biasing spring 70 turns the reel 16, ratchet wheels 32 and inertia wheel 100 in the rewind direction. This brings an adjacent notch 163 of a series of notches 163 formed in the inner wall of the flange 155 into alignment with the tang 160. Under the urging of the pawl biasing spring 83, the tang 160 will snap into the aligned notch 163. The flange 155 serves to limit further turning of the pawl means 25 towards its release position under the urging of the pawl biasing spring 83.

The tang 160 is, in this instance, a small protuberance projecting laterally from a side wall 171 of the pawl 26 toward the inertia wheel 100 and spaced inwardly from the pawl nose 35 which is on an extremity of the pawl 26. In this instance, the cooperating notches 163 extend radially outward and are cut in the interior surface of the flange 155 and also extend laterally of the flange to open in an annular side wall 165 on the inertia wheel. The notches are positioned in the flange 155 at circumferentially spaced locations to assure that the tang 160 slides into a notch 163 before the surface 37 of the preceding ratchet tooth 29 returns to abut the undersurfaces 152 (FIG. 6) of the pawls 26. The tang 160 and an aligned notch 163 serve as detent means for detenting the inertia wheel 100 and reel 16 to hold the extended belt portion 21 tensionless.

When the tang 160 is in a notch 163, the inertia wheel 100 is held by the pawl 26 having the tang against rotation by the reel biasing means 19 as would retract the seat belt. More specifically, the tang 160 holds the inertia wheel 100, and its spokes 105 hold reel extensions 117, the reel hub 57 and the reel spindle 49 against turning. The spring 102 urges the spokes 105 to remain in their longitudinal inward positions adjacent the near ratchet wheel 32 and holds inertia wheel 100 from shifting longitudinally outward and releasing the tang 160.

To release the belt from tensionless state to a tensioned state, the inertia wheel flange 155 and its notch 163 are shifted longitudinally on the reel 16 to uncover the tank 160 whereby the pawl spring 83 pivots the pawls 26 to the non-blocking position spaced from the ratchet teeth 29. More specifically, a pull on the seat belt causes the spindle 49 and reel 16 to turn relative to the inertia wheel 100 for the tang 160 in the notch 163 prevents the inertia wheel from rotating. Thereby the reel extensions 117 with the camming surfaces 119 cam the inertia wheel spokes 105 to shift them longitudinally outward from the tang 160. After the inertia wheel 100 shifts to uncover the tang 160, the pawls 26 move to release the ratchet teeth 29 and, upon release of the belt, the reel biasing means 19 becomes effective to tension the belt about the occupant. If the belt buckle is released, the belt is wound upon the reel 15.

To further facilitate an understanding of the timing operation of the pawls 26 relative to the ratchet teeth 32, a brief explanation of an inertia locking operation will be given, whether occasioned by an accident or in order to place the belt in its tensionless condition. With the belt extended in tension about a person and a sharp pull extending the belt with an acceleration over 0.7 G will cause the inertia means 23 to operate as the belt turns the reel 16 relative to the inertia wheel 100. The intertia of the wheel 100 causes it to lag, aided by the "psuedo-inertia" of the brake disk 135 whereby the cam surfaces 119 on the reel extensions 117 cam the spokes 105 longitudinally outward of the adjacent ratchet wheel 32. After the inertia wheel 100 has turned about 7.5° relative to the ratchet wheel, it will have been displaced longitudinally about 0.030 inch to turn one of its teeth 150 into initial engagement with the pawl finger 93. The force of the pawl spring 83 is usually greater than this initial impact from the tooth 150. As a result the pawls 26 remain open in their position spaced from the ratchet teeth 29. As the reel 16 continues to rotate relative to the inertia wheel 100 through about another 3° or 4°, the inertia wheel displaces longitudinally to its maximum longitudinal displacement of approximately 0.090 inch at which time the spokes 105 of the inertia wheel 100 abut hub walls 123 of the reel extensions 117, whereupon the inertia wheel 100 and ratchet wheels 32 may no longer rotate relative to each other. A continued turning of the reel 16 and inertia wheel 100 in the belt extending direction through an angle of approximately another 6½° is sufficient to pivot the pawl finger 93 against the force of the pawl spring 83 to rotate the pawls 26 through an angle of about 7½° by the time the pawl finger 93 has separated from the tooth 150. The tooth 150 continues turning past the pawl finger. During the camming of the pawl finger 93, the pawls 26 rotate to the closed position in which the underlying surfaces of the pawls are generally parallel to guide surfaces 37 on the ratchet wheels 32 and spaced slightly thereabove. As the teeth 29 are spaced 45° apart and the teeth 150 operate about one-half or less than this amount of turning, the pawl noses 35 will usually be at about the center of the guide surfaces 37 when the teeth 150 leave the pawl finger 93. If the camming action of the cams on the pawl finger 93 is made with considerable force, the pawl noses 35 may pivot to abut the guide surfaces 37. In any event, the ratchet wheels 32 are turning with such speed that the pawls 26 cannot reverse their direction of movement and travel outwardly from ratchet wheels 32 under the urging of the pawl spring 83 before the inclined teeth walls 153 abut the pawl noses 35. In this instance, the ratchet teeth 29 rotate about another 10° before abutting the pawl noses 35. This stops the rotation of the reel 15, preventing further extension of the belt, thus retaining the occupant in his seat in the event of an accident.

At the same time, this action holds the pawls 26 against outward pivotal movement from the teeth 29. Before the pawls 26 can separate from the ratchet teeth 29 and pivot outwardly, the inertia wheel 100 will have returned under the urging of the spring 102 by winding down the cam grooves 115 to a position to trap the pawl tang 160 beneath the inertia wheel flange wall 155. Upon release of the accelerating force, the retractor is in its tensionless condition. Upon release of tension in the belt, the reel 16 is free to be turned slightly in the retracting direction, for example, by about 15° under the urging of reel rewind spring 19. As the ratchet wheel turns, it carries the inertia wheel 100 with it and turns a notch 163 into an aligned overlying relationship with the tang 160 which upon a slight pivoting of the pawl 26 under the urging of pawl spring 83 pivots outwardly into the aligned notch 163. As explained previously, the pawl tang 160 holds the inertia wheel act on the cam surfaces 119 of the reel extensions 117 to hold the reel 16 and spindle 49 against turning in the retraction direction under the urging of the reel biasing spring 70. Thus, the extended belt is held free of tension of the reel spring 70 and the extended belt is tensionless.

In the event the belt is in the tensionless condition at the time of an accident, the occupant's body will extend the belt rapidly under an acceleration above about 0.7 G. This quickly turns the adjacent ratchet teeth 29 through an arc of about less than 15° to abut the pawl noses 35, which are already down in a closed position, against the inclined walls 153 of the teeth before the spring 83 can act to withdraw the pawls 26 after the tang 160 is released. The inclined walls 153 may drive the pawl noses further inwardly to the bases of the teeth. This locking of ratchet teeth 29 and pawls 26 holds the belt against complete extension as may allow the belt wearer to hit a window, steering wheel or the like. The retractor thus locks in the event of accident irrespective of whether it is in its tensionless condition.

When it is desired to return from the tensionless state to the tensioned state for the belt, the occupant need merely pull on the belt to extend the same sufficiently to shift the inertia wheel 100 to release tang 160, whereupon the pawl spring 83 will pivot the pawls 26 to their open non-blocking position. More particularly, the pull on the belt may be slow or fast, intentional or unintentional, so long as it is not so fast as to abut the pawls 26 against the teeth 29 before the spring 83 can withdraw the pawls 26 after release of the tang 160. It will be appreciated that inertia wheel 100 is held by the tang 160 against turning with reel during this belt extension. As belt is protracted, the spokes 105 are cammed longitudinally by the cam surfaces 117 within less than 15° of ratchet wheel turning to release the tang 160, whereupon the spring 83 withdraws the pawls 26.

In accordance with another embodiment of the invention, the inertia locking retractor may be made without the tensionless feature by removing the tang 160 from the pawl 26. The operation described above will be generally the same except that the inertia wheel flange 155 cannot capture and hold the pawls 26 from being returned by the pawl spring 83. Even though the inertia wheel 100 has returned to adjacent the left ratchet wheel 32 before tension in the belt is released, the release of the belt tension allows the reel spring 70 to turn the ratchet teeth 29 in the retracting direction and from abutment with the inclined surfaces 37 whereupon the pawls 26 will be unimpeded in pivoting past the inertia wheel flange 155 to the release or open position spaced from inertia wheel 100 and ratchet wheels 32. Therefore, the seat belt retracting spring 19 is free to turn the reel in the retracting direction until the belt is taut about the occupant. Thus, it will be seen that the inertia locking retractor may be by simple modifications changed from the tensionless to the tension kind.

In accordance with another embodiment of the invention, the inertia means 23 is disabled after an initial slight extension of the belt so that a sudden jerk or snap on the belt is ineffective to block further belt extension of the belt. During securement of the belt about occupant, a slight retracting movement of the reel will occur whereupon the inertia means 23 is again enabled to operate and lock further belt extension as in the case of an accident. Such embodiment of the invention is illustrated in FIGS. 10-19. Because this embodiment of the invention operates substantially in the manner described above for the embodiment of the invention illustrated in FIGS. 1-9, it will not be described in such detail except for the description of the hold-out means 40 and the inertia means 23. As will be explained in greater detail, a slight retraction of the extended belt 17 occurring at the time of buckling the belt sections together deactivates the hold-out means 40, thereby allowing the inertia means 23 to operate the pawl means 25 to lock the reel 16 against further belt extension if there should be an accident. Also, as will be explained in greater detail, the retractor illustrated in FIGS. 10-19 is constructed with parts which can be readily assembled and economically produced as required for a commercially acceptable seat belt retractor.

Very generally, the seat belt retractor illustrated in FIGS. 10-19 comprises a U-shaped frame 181 having a central base 182 spanning a pair of upstanding flanges 183 and 184 on which is journaled a rotatable reel supporting spindle 185. A coiled power spring 187 is mounted in a spring housing 188 fastened to upstanding flange 183 for turning the reel 16 in the rewind direction. One end of the spring 187 is secured to the upstanding flange 183, and its other end is secured to the adjacent one of the pairs of ratchet wheels 32 for the reel. In this embodiment of the invention, the inertia means 23 is disposed outwardly of the upstanding flange 184 and is protected by a cover or housing 193. As will be explained, the inertia means 23 pivots pawl means 25 against the force of a biasing spring 197 secured to the frame base 182 to bring pawl noses 199 of a pair of pawls 200 into position for abutting the teeth of the respective ratchet wheels 32. As will be explained in greater detail, the operation and timing of inertia means 23 and pawl means 25 is substantially the same as hereinbefore described for the embodiment of the invention in illustrated FIGS. 1-9.

Referring now in greater detail to the inertia means 23 illustrated in FIGS. 10-13 and 19, it comprises a cam means 114 having an inertia cam or cam member 201 which is keyed to a ratchet wheel 32 by three radially extending lugs 202 (FIG. 19) which are fitted into three complementary radially extending slots 203 in the ratchet wheel 32. The lugs 202 are attached to a rear small diameter cylindrical portion 204 which projects through a suitable opening in the upstanding flange 184. The ratchet wheel has a central opening 205 through which projects a threaded end 206 of the reel spindle 185 which supports the reel for rotation.

The hub of the reel is connected to the ratchet wheel 32 at slots in the manner previously described in connection with FIGS. 1-9. A threaded nut 208 is threaded on end 206 of the spindle 185 to hold the cam member 201 against shifting longitudinally outward of the ratchet wheel 32.

Figure 19:
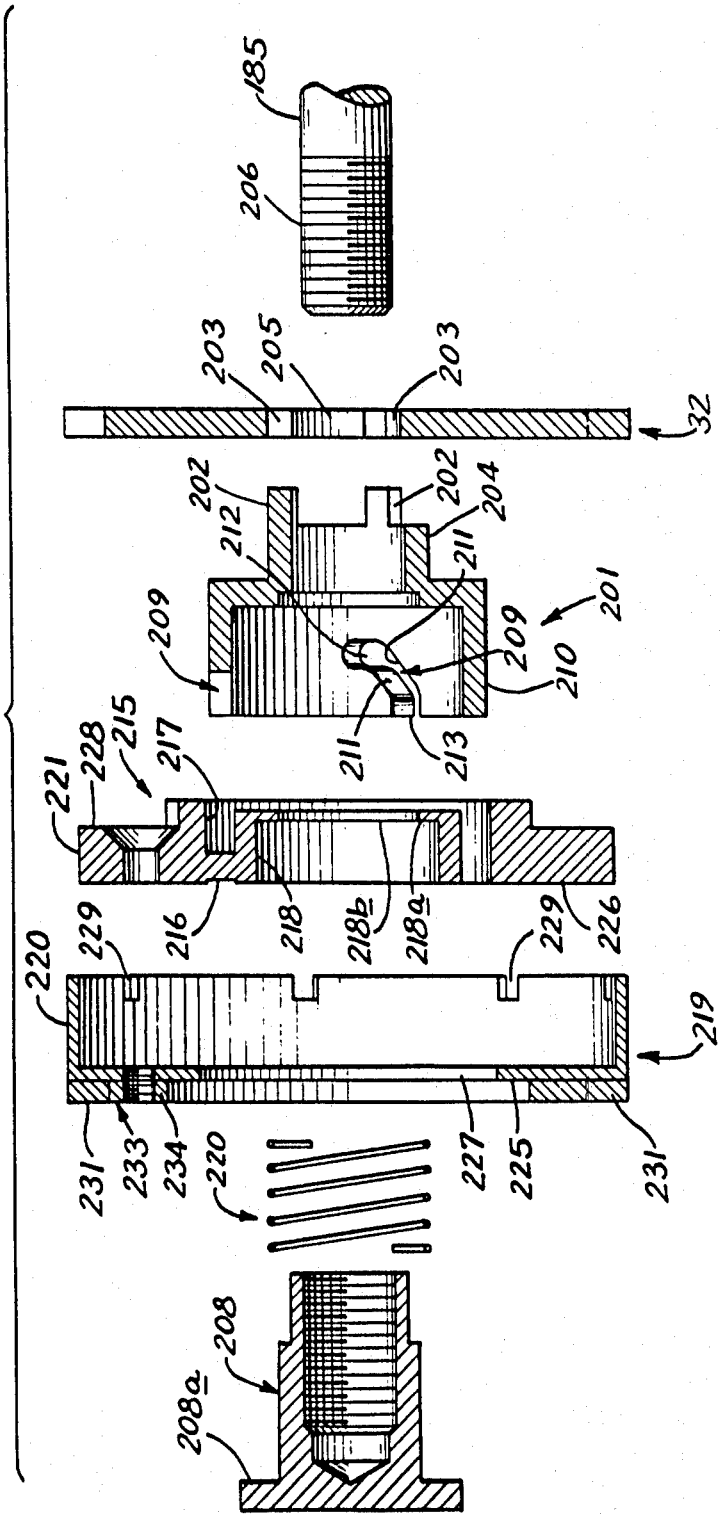

Preferably, the inertia cam 201 is a single integral generally cylindrical member molded from a plastic material with three camming grooves or slots 209 which are spaced from each other by 120° in a generally cylindrical wall 210 having an axis coaxially aligned with the reel axis. As best seen in FIGS. 12 and 19, the grooves 209 are formed with spaced camming walls 211 which are inclined to the longitudinal axis or direction of the reel. The camming grooves 209 extend in arcuate direction from an end 212 adjacent the ratchet wheel 32 to an outer opening 213, as best seen in FIG. 10. The camming grooves 209 may extend as shown at 45° to the axis of rotation and function in the manner as the above-described camming grooves 115.

The inertia means 23 illustrated in FIGS. 10-19 comprises a multi-piece inertia wheel or member 214 which functions similarly to the above described inertia wheel 100. More specifically, the inertia wheel cooperates with the inertia cam 201 and its camming grooves 209 for shifting longitudinally on the inertia cam 201 to a position to actuate the pawl means 25 to engage the ratchet wheels 32. The illustrated inertia wheel 214 is formed of three pieces including an inner ring or member 215 having three radially and inwardly projecting cylindrical spokes or cam followers in the form of cylindrical pins 216 spaced at 120° and inserted into the cam grooves 209 in the inertia cam 201. The inner inertia ring 215 has a bore wall 217, as best seen in FIG. 19, which slidingly telescopes onto the outer surface of the cylindrical wall 210 of the inertia cam 201 for turning freely relative thereto and/or freely sliding longitudinally relative to the cylindrical wall 210 to the extent permitted by the cam slots 209. The inner inertia ring 215 is preferably molded in one piece and from a plastic material with the three pins projecting along radial lines toward the axis of rotation for the reel 16 and joined at the radially inner ends to a cylindrical sleeve 218 having a radially inwardly extending apertured wall 218a which seats one end of a compression spring 220. The spring 220 is compressed between the head 208a of the nut 208 and the end wall 218a to bias return the inertia wheel 214 to a position adjacent the ratchet wheel 32. The inner end of the nut 208 extends through an opening 218b in the end wall 218a.

Encircling the inner inertia ring 215 is an outer inertia ring or cylinder 219 which is secured thereto in any suitable manner as by keying to prevent relative rotation between the inner ring 215 and outer cylinder 219 which comprises the inertia wheel 214. The outer inertia cylinder 219 is preferably of metal, e.g., steel, to provide a heavy portion of the desired mass for the inertia wheel 214 to cause locking of the reel at accelerations of the belt above 0.7 G's. The outer inertia cylinder 219, as best seen in FIGS. 10, 12 and 19, includes an outer circumferential wall 220 encircling an outer, circular circumferential wall 221 of the inner inertia member 215 and further includes an annular end wall 225 (FIG. 12) having a central opening 227 therein through which projects the nut 208. As best seen in FIG. 12, the end wall 225 of the outer ring 219 is in face-to-face engagement with an end face 226 of the inner ring 215.

The outer circumferential wall 220 extends in the longitudinal direction towards the ratchet wheel 32 beyond opposite face 228 of the inner ring 215 toward the pawl nose 199 to position a series of exposed notches 229 to cooperate with a pawl tang 230 on the adjacent pawl 200 to provide a tensionless feature for the retractor in the manner that the tang 160 cooperated with the notches 163 to hold the inertia wheel 100 in the embodiment of FIGS. 1–9. The notches 229 are larger than the notches 163 and extend entirely through the circumferential wall 220 in contrast to the smaller internal notches 163 described above. However, the tang 230 is substantially larger than the tang 160 and is of a size larger than the notch to prevent the tang from passing through one of the notches. The tang 230 slides along the inner side of the circumferential wall 220 to abut a notch 229 and hold the inertia wheel 214 in the manner above described in connection with FIGS. 1–9.

The pawl actuating means on the inertia wheel 214 is in the form of a series of circumferentially spaced teeth or projections 231 on a star wheel 233 comprising the third portion of the inertia wheel 213. The teeth 231 project radially outward from a central ring 234 and are separated by a series of arcuate spaces between the teeth. In this instance, the inertia star wheel 233 is provided with eight equally spaced teeth 231 which have a radial extent of about 0.12 inch beyond the ring 234. Preferably, leading sides 235 of the teeth 231 will abut a pawl actuating finger and are formed with inwardly beveled side portions extending to trailing sides of the teeth. The star wheel 233 is also formed of metal and is fastened to outer cylinder 219 or by screws carried by the outer inertia member 220 and threaded into tapped openings in the star wheel 33.

In a manner similar to that described above in connection with FIGS. 1–9, the spacing of the pawl actuating teeth 231 on the star wheel 233 of the inertia wheel 214 and the location of the star wheel 233, cam grooves 209 and pawl actuating finger 236 relative to ratchet wheels 32 and pawl nose 199 causes a pivoting of the pawl noses to positions to be captured beneath the ratchet teeth 29 and to abut the base of the ratchet teeth. As stated previously, the tang 230 is similar to but considerably larger than the tang 160. It is captured beneath the circumferential wall 220 of the inertia wheel 214 to slide along the inner surface of the circumferential wall until entering one of the notches 229 which prevents turning of the inertia wheel 214 and hence limits motion of the inertia cam member 201 and ratchet wheels 32. Thus, the tang 230 operates to hold the reel 16 against turning in the rewind direction under the urging of the power spring 187 with the seat belt 17 being held in the tensionless state against the rewind forces from the power spring 187.

Preferably, a braking disk 249 is mounted coaxially with the inertia cam 201 and the inertia wheel 214 with one face 251 thereof in frictional contact with the ring 234 of star wheel 233 to provide pseudo inertia and to dampen any oscillations of the inertia member, as described hereinbefore in connection with the braking disk 135. As best seen in FIGS. 17 and 18, the illustrated braking disk is generally annular with a pair of central collars 253 about a central opening 254. One collar 253 projects into the central opening of the adjacent star wheel 233 and the other collar 253 seats one end of another coiled compression spring 255 (FIG. 10). The coiled spring 255 is a compression spring compressed between an annular wall 257 on the cover 193 and the facing side of the braking disk 249 to provide an axially directed force on the inertia wheel 214 to cause it to return adjacent the ratchet wheel 32 and to return the pins 216 to ends 212 of the cam slots 209. In this connection, the braking disk 249 and spring 255 function similarly to the braking disk 135 and spring means 102.

The preferred hold-out means 40 for preventing operation of the inertia means 23 during extension of the belt 17 from its fully wound position holds the inertia wheel 214 against longitudinal shifting toward the dust cover 193 to where the teeth 231 thereon would be in a plane to abut the pawl actuating finger 236 and cause a locking of the retractor. It will be recalled that the inertia locking operation will occur for accelerations of the belt above 0.7 G. However, such belt accelerations could occur with a sharp pull and fast acceleration as the occupant pulls the belt toward his body preparatory to buckling up. The hold-out means 40 allows the fully wound belt 17 to be accelerated beyond 0.7 G without locking after a short initial movement of the belt in the unwinding direction. However, the hold-out means 40 is deactivated with a slight retraction of the belt 17 as occurs when buckling up, so that a subsequent 0.7 G acceleration of belt 17 at the time of an accident results in a locking of the retractor against further belt extension. Of course, with a 0.3 G acceleration or less the belt 17 will not operate the inertia means 23 to lock the reel 16 because the inertia of the inertia wheel 214 is insufficient to overcome the force of the springs 220 and 255.

For the purpose of blocking longitudinal shifting of the inertia wheel 214 to its pawl actuating position during initial unwinding of the belt 17 from the reel 16, the hold-out means 40 comprises a means 256 (FIGS. 14 and 15) which shifts with the inertia wheel 214 relative to a stationary stopping means 258, which blocks the inertia wheel 214 from shifting to the pawl actuating position to bring teeth 231 into a plane to hit the pawl actuating finger 236. In this instance, the means 256 comprises tabs 259 on the braking disk 249 which is moved axially by the inertia wheel 214 toward the dust cover 193 having the stopping means 258 which, herein, is in the form of a stopping shoulder means 261. The stopping shoulder means 261 is formed integral with the dust cover and is spaced further from the smallest diameter, inner circular end wall 260 of the cover than a bottom wall 262 for each of three adjacent recesses or openings 263. Preferably, three such shoulder means 261 of limited arcuate extent are formed and when the tabs 259 are aligned therewith hold the braking disk 249 from shifting to the extent it will shift when the tabs 259 are aligned with the openings 263. Only when the tabs are in the openings 263 may the inertia wheel 214 shift axially sufficiently to bring the teeth 231 to their pawl actuating position. Thus, depending on the angular position of the tabs 259 relative to openings 263, the inertia wheel is either blocked from or allowed to shift its teeth 231 to the pawl actuating position.

The natural motion of a person using the seat belt is to grasp the exposed buckle end or the tongue plate and give a slight pull on the full retracted belt at an acceleration of less than 0.3 G and then to pull it with a greater acceleration. Thus, the inertia wheel 214 turns slightly initially at this fully wound belt position to bring the braking disc tabs 259 into position to abut an axially extending wall 267 and into alignment with the shoulder means 261. The walls 267 extend longitudinally between the shoulder means 261 and arcuate walls 268 and serve to limit the counterclockwise turning of the disk, as viewed in FIG. 15. Likewise, end walls 269 extending from the other ends of arcuate walls 268 to the bottom walls 262 of the openings 263 limit the clockwise movement, as shown in FIG. 15, of the disk.

Following this short initial extension of the belt 17 from the fully wound position, the tabs 259 are aligned with the shoulder means 261 thereby disabling the inertia means 23 and allowing belt 17 to be pulled rather sharply at accelerations which would lock the retractor but for the hold-out means 40. As the best 17 is buckled about the occupant, a slight retraction of the belt 17 naturally occurs under the movement of the power spring 187 which turns the inertia wheel 214 as well as the braking disk 249 to bring the tabs 259 against a longitudinally extending sidewall 269 of the recess 263 thereby preventing further turning of the braking disk 249 and its tabs 259. This assures that the tabs are aligned with the openings 263 irrespective of any further retraction of the belt and turning of the inertia wheel 214 in the rewind direction. Should an accident occur, the fast acceleration of the belt 17 operates inertia wheel 214 which moves its pins 216 axially in the cam slots 209 forcing the braking disk 249 axially and deeper into the openings 263 against the urging of the coil spring 255 before the tabs 259 turn into alignment with the shoulder means 261.

If it is preferred that the hold-out means 40 be overridden with a very fast acceleration of the belt, e.g. 2 G or above, as such an acceleration is more typical of an accident than a fast initial extension of the belt from a fully wound condition, then an inclined shoulder means 261a such as shown in FIG. 16 may be provided on the dust cover. This is a fail-safe safety feature to assure that at belt accelerations of 2G or more, the inertia means 23 locks the reel 16 against further belt extension, even when the hold-out means 40 is in its hold-out position. To this end, the shoulder means 261a are inclined at a predetermined angle relative to the longitudinal direction and between the bottom walls of the recesses 263 and the annular walls 268 and will function as inclined surfaces forcing the tabs 259 in engagement therewith to slide therealong and into the openings 263 when the inertia wheel 214 applies a force to the tabs 259 caused by a 2G or greater acceleration of the belt 17.

In accordance with a still further embodiment of the invention (not shown herein), the illustrated pawl spring 83 or 197 is removed and an overcenter spring (not shown) is substituted therefor to function to bias the pawls 26 to an outer release or free position in which the pawls are spaced from the ratchet wheels 32 until an inertia wheel tooth 150 or 231 abuts the pawl finger 93 or 136 and pivots the pawl means through an intermediate central or dead position after which the spring becomes effective to bias the pawl into engagement with the ratchet teeth 29. By having the overcenter spring of a predetermined strength and slowly releasing the belt, it has been found possible to have the ratchet wheels 32 held against turning by friction and the force of the pawl spring urging the pawls against the ramps on the back side of the ratchet teeth. This prevents retraction of the extended belt under the urging of the reel spring 70 or 187. As a result, the belt will remain tensionless without the use of a tang 160 or 230 and an inertia wheel notch 163 or 229. With the pawls 26 biased against the pawl guide surfaces 37, the pawls have been found to exert sufficient force to prevent more than a slight turning in the withdrawal direction which merely separates the noses 35 or 199 from the reversely inclined teeth wall 153. In this embodiment of the invention, the pawls 26 will remain biased by the overcenter spring into this position for blocking the extension of the belt particularly at the time of an accident. To release the pawls 26 and to shift them through the center position to where the pawls 26 are free and clear of the ratchet wheels 32 and are biased in the opposite direction to the released position, the operator must merely pull the seat belt to cause the reel means to rotate slightly to abut the pawl noses 35 or 199 against the inclined tooth walls 153 and then quickly release the belt to allow the reel spring to rewind the belt at sufficient velocity to cause the ratchet teeth 29 to hit the pawls 26 with sufficient impact to pivot the pawls 26 to the position spaced from the ratchet wheels 32. Any fast extension of the belt, however, will cause the inertia wheel 100 or 214 to actuate the pawl finger 93 or 236 to pivot the pawls 26 through the overcenter position to block the ratchet teeth 29.

From the foregoing, it will be seen that the inertia locking retractor may be constructed with or without the tensionless feature. Also, the retractor may be constructed either with or without a hold-out means to prevent locking of the retractor with a fast acceleration of the belt from its fully wound condition. In any case, the inertia retractor will be effective to lock belt extension at belt accelerations above a predetermined acceleration at the time of an accident. The inertia retractor is simple to release upon a slight manipulation of the extended belt end. Moreover, the retractor, particularly the embodiment illustrated in FIGS. 10–19, may be constructed with low cost components which may be assembled readily to produce a commercially acceptable retractor.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. A seat belt retractor comprising: support means, reel means rotatably mounted on said support means to rotate about a longitudinal axis, a belt mounted on said reel means for unwinding therefrom to be positioned about an occupant, biasing means biasing said reel means to rewind said belt on said reel means, a pair of ratchet wheels mounted on opposite sides of said reel means and turnable therewith, pawl means including a pair of pawls pivotally mounted on said support for movement into engagement with said ratchet wheels to block unwinding of said belt from said reel means, inertia operable means for pivoting said pawls into blocking engagement with said ratchet wheels at time of an accident, tension relieving means operable by manipulation of said belt comprising a member coupled to said reel means and a detent means engageable with said member to hold said reel means against turning in the retracting direction and relieving the extended belt from the tension of said biasing means, and means including a cam means operable upon a subsequent protraction of said belt for disabling said detent means and allowing said reel means to rewind the protracted belt.

2. A seat belt retractor in accordance with claim 1 in which said member is disk-shaped with a plurality of stop surfaces spaced angularly thereabout and in which said detent means is engageable with a stop surface after partial rewind of said belt following the protraction thereof.

3. A seat belt retractor comprising: support means, reel means rotatably mounted on said support means to turn about a longitudinal axis through said reel means, means for mounting a belt on said reel means for unwinding therefrom and extending to a position about an occupant and for retracting and rewinding on said reel means, reel biasing means biasing said reel means to rotate about said axis in the direction to retract said belt, ratchet means rotatable with said reel means and having a shoulder thereon, pawl means movable from a release position spaced from said shoulder to a blocking position for engagement with said shoulder to block said reel means against turning in the belt extending direction, pawl biasing means urging said pawl means to said release position, inertia means coupled to said reel means and operative in response to an angular acceleration of said reel means greater than a predetermined acceleration in the belt extending direction to actuate said pawl means against the urging of said pawl biasing means from said release position to said blocking position to block further extension of said belt, tension on said belt maintaining said pawl means at said blocking position until the belt tension is released, said reel biasing means turning said reel means in the rewind direction from said blocking position with release of belt tension to shift said pawl means from said shoulder allowing said pawl biasing means to shift said pawl means from said blocking position towards said release position, means on said inertia means and engageable with said pawl means when moving toward said release position from said blocking position to hold said reel means against turning in the rewind direction and to relieve the extended belt from the tension of said reel biasing means, and means associated with said reel means and operable with a subsequent extension of said belt to operate said last-mentioned means to release said pawl means for return by said pawl biasing means to said release position thereby releasing said reel means for turning in the belt extending direction or in the belt rewind direction.

4. A retractor in accordance with claim 3 in which said inertia means comprises an inertia wheel means mounted coaxially with said reel means and in which said means on said inertia means engageable with said pawl means is on said inertia wheel means.

5. A retractor in accordance with claim 4 in which said means associated with said inertia means is operable with a subsequent extension of said belt and comprises a camming means on said inertia wheel means and on said reel means to couple said inertia wheel means and said reel means for rotation together at accelerations below said predetermined acceleration, said camming means causing said inertia wheel means to move longitudinally in a first direction and rotationally relative to said reel means when said belt is extended and said reel means is accelerated faster than a predetermined acceleration to move said pawl means to said first blocking position.

6. A retractor in accordance with claim 3 in which said pawl means comprises a pair of pawls each having a pawl nose at one end thereof, said pawl biasing means urging said pawl noses towards said release position, and said ratchet means comprising a pair of ratchet wheels having a plurality of shoulders equally spaced about the circumference of said ratchet wheels and further comprises slide surfaces disposed intermediate said shoulders and along which said pawl noses may slide to abut one of said shoulders at a position spaced radially inward of the outer radial extremity of said shoulders thereby preventing shearing of shoulders with exertion of strong pulling forces on said belt means.

7. A retractor in accordance with claim 5 in which a biasing means biases said inertia wheel means to slide longitudinally relative to said reel means in a direction opposite to said first direction and a friction means retards rotational movement of said inertia wheel.

8. A retractor in accordance with claim 7 in which said camming means on said reel means and said inertia wheel means comprises elongated cam slots inclined to said longitudinal axis and further comprises cam followers projecting radially into said slots, said inertia wheel means turning relative to said reel means and shifting longitudinally as said cam followers travel in said cam slots.

9. A retractor in accordance with claim 8 in which said inertia wheel means comprises a bell-shaped member having radially extending spokes constituting a portion of said camming means, in which said means on said inertia means and engageable with said pawl means comprises a flange on said bell-shaped member for overlying and capturing a portion of said pawl means to hold said reel means against turning in the rewind direction and tensioning the belt about the occupant, and in which projections are spaced angularly about said bell-shaped member for actuating said pawl means to said blocking position.

10. A retractor in accordance with claim 8 in which said inertia wheel means comprises an inner inertia wheel member having pins serving as said camming means for projecting into said cam slots, an outer inertia wheel member, said means associated with said reel means and engageable with said pawl means comprising a flange on said outer inertia wheel member for overlying and capturing said pawl means to hold said reel means against turning in the rewind direction thereby holding said belt tensionless on the occupant, and projections spaced angularly about said outer inertia wheel member for actuating said pawl means to said blocking position.

11. A seat belt retractor comprising: support means, reel means rotatably mounted on said support means to rotate about a longitudinal axis, means for mounting a belt on said reel means for unwinding therefrom and to a position about an occupant and for retraction and rewinding on said reel means, biasing means biasing said reel means to retract said belt, a ratchet wheel coaxial with said reel means and rotatable therewith and having a plurality of ratchet teeth and having surfaces intermediate said teeth and spacing the teeth from each other, an inertia wheel means coaxial with and coupled to said reel means for turning in a first plane and positioned adjacent said ratchet wheel when said reel means accelerates below a predetermined angular acceleration, cam means coupling said inertia wheel means and said reel means and allowing said inertia wheel means to turn relative to said reel means to a limited extent and to shift longitudinally relative to said reel means for a limited extent to an actuating position when said reel means accelerates above said predetermined acceleration, said cam means including an inertia cam member having a curved supporting surface, said curved supporting surface extending in a direction away from said ratchet wheel, said inertia wheel means telescoped on said curved supporting surface to shift longitudinally and angularly with respect thereto, projecting actuators on said inertia wheel means having a predetermined angular relationship with respective teeth on said ratchet wheel, pawl means including a member located in a path of travel of said projecting actuators for engagement thereby and including a pawl pivotally mounted on said support means for pivoting between a release position spaced from said ratchet wheel and an operative position for engaging said ratchet teeth, means for limiting the relative rotation between said reel means and said inertia wheel to a limited angular movement and for limiting the longitudinal shifting of said inertia wheel on said curved supporting surface to a predetermined extend, said pawl being shifted to said operative position within a predetermined angular movement by engagement of one of said projecting actuators with said pawl means member and a given turning movement of said ratchet wheel so that said pawl is presented to said surfaces intermediate successive ratchet teeth on said wheel and so that further rotation of said ratchet teeth with further belt extension abuts one of said teeth against said pawl and blocks further extension of said belt.

12. A retractor in accordance with claim 11 in which cooperable means are provided on said inertia wheel means and said pawl to hold said reel means against turning in the rewind direction thereby relieving the extended belt of tension from the reel biasing means.

13. A retractor in accordance with claim 12 in which said cooperable means comprises a flange on said inertia wheel means and a tang on said pawl for capture by said flange thereby holding said ratchet wheel and reel means against turning in the rewind direction.

14. A retractor in accordance with claim 13 in which said pawl means comprises a biasing means urging said pawl to said release position, said inertia wheel flange has notches therein cooperating with said tang to hold said pawl against the urging of said biasing means when said tang is inserted into a notch, a subsequent pull on said belt turning said reel and causing said cam means to shift said inertia wheel and said notch from said tang so that said pawl biasing means may pivot said pawl to said release position.

15. A retractor in accordance with claim 14 in which spring means urges said inertia wheel means axially along said curved supporting surface toward said ratchet wheel and a retarding means frictionally retards said inertia wheel against turning.

16. A retractor in accordance with claim 11, in which a holdout means is provided for operation with extension of said belt from a fully retracted position on said reel means to hold said inertia wheel means against being cammed by said camming means to shift longitudinally to a position for actuating said pawl means to said operative position.

17. A retractor in accordance with claim 16 in which said hold-out means comprises a hold-out member frictionally coupled to said inertia wheel means and a stationary means supported by said support means to engage said hold-out member and to limit movement of the hold-out member and the inertia wheel means by said camming means.

18. A retractor in accordance with claim 17 in which said stationary means is a cover having an axially extending opening and a hold-out surface spaced angularly therein about said reel rotational axis, and said hold-out member has a portion which turns between positions aligned with said opening and with said hold-out surface.

19. A seat belt retractor comprising: support means; reel means rotatably mounted on said support means to turn about a longitudinal axis through said reel means, means for mounting a belt on said reel means for unwinding therefrom and extending to a position about an occupant and for retracting and rewinding on said reel means, biasing means biasing said reel means to rotate about said axis and to retract said belt, ratchet means rotatable with said reel means and having a shoulder thereon, pawl means movable from a release position spaced from said shoulder to blocking position in engagement with said shoulder to block said reel means against turning in the belt extending direction, inertia means coupled to said reel means and operative in response to manipulation of said belt and angular acceleration of said reel means in the extending direction greater than a predetermined rate to actuate said pawl means to engage said shoulder and block further extension of said belt means engageable with said pawl means when said reel means turns from engagement with said shoulder to hold said pawl means adjacent but spaced from one of said shoulders on said ratchet means and for engagement with said shoulder if said belt should be extended with an acceleration greater than a predetermined acceleration and holding said reel means against retracting said belt thereby relieving the extended belt from the tension of said reel biasing means, means for returning said pawl means to said release position after a protraction of said extended tensionless portion of said belt, and hold-out means operative with initial protraction of the fully wound belt on said reel means to block operation of said inertia means and said pawl means from preventing initial extension of said fully wound belt at an acceleration faster than said predetermined acceleration, said hold-out means being shifted by said reel means to an inoperative position with turning of said reel means to rewind said belt.

20. A seat belt retractor in accordance with claim 19 in which said hold-out means comprises a stationary cover carried by said support means and further comprises a turnable member frictionally coupled to turn with and in the direction of rotation of said reel means, said cover having stopping surface means to limit turning of said turnable member between an operative position to prevent the operation of said inertia means and an inoperative position in which said inertia means is free to actuate said pawl means.

21. A seat belt retractor comprising: support means, reel means rotatably mounted on said support means to turn about a longitudinal axis through said reel means, means for mounting a belt on said reel means for unwinding therefrom and extending to a position about an occupant and for retracting and rewinding on said reel means, reel biasing means biasing said reel means to rotate about said axis in the direction to retract said belt, said reel biasing means tensioning said belt about occupant unless said belt is manipulated and accelerated to turn said reel means at an angular acceleration greater than a predetermined angular acceleration, inertia means coupled to said reel means and movable thereby to an actuating position in response to manipulation of said belt and angular acceleration of said reel means greater than a predetermined acceleration in the belt extending direction, means actuated by said inertia means for blocking the motion of said reel means in the belt extending direction, said reel biasing means turning said reel means in the rewind direction after being blocked with release of tension on said belt, and tension relieving means coacting with said inertia means and coupled to said reel means and operative with said inertia means following said blocking the motion of said reel means in the belt extending direction and after a partial rewind of said belt for stopping the rewind motion of said reel means in the belt retracting direction and relieving the extended belt from the tension of said biasing means.

22. A retractor in accordance with claim 21 wherein said tension relieving means in operated upon extension of the belt with force producing angular acceleration of said reel means greater than a predetermined acceleration.

23. A retractor in accordance with claim 22 wherein said tension relieving means is coupled to said inertia means and is operated upon operation thereof to stop extension of the belt.

24. A retractor in accordance with claim 22 wherein said tension relieving means is disabled by a subsequent pull on the belt.

25. A retractor comprising a support means, reel means rotatably mounted on said support means to turn about a longitudinal axis through said reel means, means for mounting a belt on said reel means for unwinding therefrom and extending to a position about an occupant and for retracting and unwinding on said reel means, biasing means biasing said reel means to rotate about said axis in a direction to retract said belt, ratchet means connected to said reel means for turning therewith, pawl means movable from a release position spaced from said ratchet means allowing turning thereof with said reel means to a position to engage said ratchet means to block further extension of the belt, and to an intermediate position to be engaged by said ratchet wheel with protraction of said belt at an acceleration greater than a predetermined acceleration, inertia means coupled to said reel means for moving relative thereto with a predetermined acceleration of said belt to a position for actuating said pawl means to engage said ratchet means to block rotation of said reel means and further extension of said belt, means for coupling said inertia means to said reel means and acting through said inertia means and said pawl means for shifting said inertia means to hold said reel means against retracting and to relieve the extended belt of the tension of said reel biasing means, and means on said coupling means for shifting said coupling means to cause said pawl means to shift to said release position spaced from blocking engagement with said ratchet means and allowing said belt to be extended further or to be retracted.

26. A retractor in accordance with claim 25 in which said pawl means comprises a pivotally mounted pawl and means for biasing said pawl to the position spaced from said ratchet means and further comprises a member on said pawl to be captured by said inertia means to hold said belt tensionless, and said coupling means comprises a cam surface and cam follower for coupling said inertia means to said reel means, said cam surface and said cam follower shifting said inertia means angularly about said longitudinal axis relative to said reel means and longitudinally relative to said reel means.

27. A seat belt retractor in accordance with claim 26 in which coupling means on said reel means shifts said pawl actuating means in a direction parallel to the axis of rotation of said reel means away from said ratchet to said actuating position and in which projection means on said pawl actuating means having a predetermined relationship with said teeth on said ratchet are shifted into alignment with a portion of said pawl means to abut the same and to pivot said pawl into engagement with one of said intermediate surfaces on said ratchet.

28. A seat belt retractor in accordance with claim 26 in which said means for returning said pawl means comprises a spring means urging said pawl to said release position and in which said coupling means shifts said pawl actuating means toward said ratchet to said inactive position with rewinding of said belt onto said reel means.

29. A seat belt retractor comprising: support means, reel means rotatably mounted on said support means to rotate about a longitudinal axis, means for mounting a belt on said reel means for unwinding therefrom and to a position about an occupant and for retraction and rewinding on said reel means, biasing means biasing said reel means to retract said belt, a ratchet coaxial with said reel means and rotatable therewith and having a plurality of ratchet teeth and having surfaces intermediate said teeth and spacing the teeth from each other, a pawl pivotally mounted on said support means for pivoting between a release position spaced from said ratchet and an operative position for engaging said ratchet teeth, pawl actuating means coupled to said reel means and shiftable from an inactive position when the belt is fully wound on said reel means to an actuating position with belt extension to positively engage and pivot said pawl to abut one of said surfaces intermediate said ratchet teeth, said pawl actuating means having a predetermined relationship relative to said ratchet teeth at said actuating position, and portions of said ratchet teeth rotatable into engagement with said pawl as further belt extension and turning of said reel means abuts one of said portions of said ratchet teeth against said pawl and blocks further extension of said belt, and means for returning said pawl from said operative position to said release position with rewinding of said belt onto said reel means.

30. A seat belt retractor comprising: support means, reel means rotatably mounted on said support means for rotation about a longitudinal axis, means for mounting a belt on said reel means, reel spring means urging said reel means to wind said belt on said reel means, a ratchet wheel fixed to turn with said reel means, a plurality of spaced ratchet teeth on said ratchet wheels, pawl engaging surfaces on said ratchet wheel extending circumferentially between adjacent ones of said teeth, a pawl pivotally mounted on said support means for pivoting into engagement with said pawl engaging surfaces and for abutting said ratchet teeth on said ratchet wheels, an actuating member for said pawl, an inertia wheel means mounted coaxially with said reel means adjacent said ratchet wheel for rotation therewith at acceleration rates below a predetermined rate, cam means associated with said reel means including a support surface supporting said inertia member for turning movement relative to said reel means and for shifting longitudinal relative to said reel means, said cam means coupling said inertia wheel means and said reel means together, pawl actuator projections on said inertia wheel means angularly positioned at predetermined locations for turning through predetermined angular movements to strike said actuating member and to pivot said pawl to a closed position adjacent said pawl engaging surfaces, said ratchet teeth turning to abut and hold said pawl against pivoting to said release position, spring means urging said inertia wheel to shift longitudinally and return to a position adjacent said ratchet wheel before said pawl is released from said ratchet teeth, a flange on said inertia wheel means having a series of spaced notches along an inner circumferentially extending surface thereof, a tang on said pawl adjacent said inertia wheel means for projection into one of said notches when said flange is overlying the same, said pawl holding said inertia wheel means against turning and thereby holding said reel means against turning in the retracting direction so that the extended belt is tensionless.

31. A retractor in accordance with claim 30 in which said support means comprises a frame having a pair of upstanding flanges with said ratchet wheel and said reel means being disposed between said flanges, said inertia wheel means being disposed on an outer side of one of said flanges, a hold-out member is positioned adjacent said inertia wheel means for selectively allowing or blocking axial shifting of the inertia wheel means, and a stationary cover means is secured about said inertia wheel member and cooperates with said hold-out member to block or allow axial shifting of said inertia wheel means to its pawl actuating position.

* * * * *

UNITED STATES PATENT AND TRADEMARK OFFICE
CERTIFICATE OF CORRECTION

PATENT NO. : 3,917,189
DATED : November 4, 1975
INVENTOR(S) : Medard Z. Bryll

It is certified that error appears in the above-identified patent and that said Letters Patent are hereby corrected as shown below:

Column 2, line 67, -- In that circumstance an, -- should be inserted after "G".

Column 2, line 67, delete "which".
Column 4, line 9, "larrge" should be --large--.
Column 4, line 27, "ojcupant" should be --occupant--.
Column 9, line 13, "eelt extened" should be --belt extended--.
Column 10, line 16, delete "act on".
Column 10, line 16, after "wheel" insert --which acts through--.
Column 12, lines 46 and 47, "220" (both occurrences) should be --220a--.
Column 13, line 34, delete "or".
Column 13, line 35, delete "220".
Column 13, line 36, "33" should be --233--.
Column 14, line 33, "220" should be --220a--.
Column 14, line 44, after "261." insert --Thus, the braking disc 249 functions as a hold-out member which is frictionally coupled to the inertia wheel 214 and the shoulder means 261 functions as hold-out surfaces.--
Column 15, line 18, "best" should be --belt--.
Column 19, line 28, "extend" should be --extent--.
Column 20, line 35, "belt means" should be --belt, means--.
Column 21, line 5, --said-- should be inserted after "about".
Column 21, line 27, "in" should be --is--.

Signed and Sealed this

Tenth Day of August 1976

[SEAL]

Attest:

RUTH C. MASON
Attesting Officer

C. MARSHALL DANN
Commissioner of Patents and Trademarks